United States Patent [19]

Saraceni

[11] 4,158,173
[45] Jun. 12, 1979

[54] MERCURY SWITCH ACTIVATED RADIO

[76] Inventor: Remo Saraceni, 1919 Brandywine St., Philadelphia, Pa. 19130

[21] Appl. No.: 825,408

[22] Filed: Aug. 17, 1977

[51] Int. Cl.² .......................... H04B 1/08; H04B 1/16
[52] U.S. Cl. ............................... 325/361; 200/61.47; 200/61.52; 200/220; 325/492
[58] Field of Search .............. 325/310, 352, 354, 357, 325/360, 361, 492, 496, 102, 119, 185, 186; 312/7 R; 200/61.47, 61.52, 61.58 R, 215, 220; D14/68, 71, 72, 75

[56] References Cited

U.S. PATENT DOCUMENTS

| | | | |
|---|---|---|---|
| 2,883,523 | 4/1959 | Meserow | 325/361 |
| 3,122,847 | 3/1964 | Redfield et al. | 325/361 |
| 3,161,738 | 12/1964 | Hall | 200/61.52 |
| 3,683,130 | 8/1972 | Kahn | 325/361 |
| 3,743,370 | 7/1973 | Lindsay et al. | 312/7 R |

*Primary Examiner*—Robert L. Griffin
*Assistant Examiner*—Marc E. Bookbinder
*Attorney, Agent, or Firm*—Weiser, Stapler & Spivak

[57] ABSTRACT

A transistor radio includes a mercury switch mounted in a fixed position within an outer housing and connected to the power circuitry of the radio. The housing has a plurality of flat surfaces to permit it to be maintained in a number of different stable positions on a supporting surface, and the mercury switch is moved between circuit activating positions, to turn the radio "on", and circuit deactivating positions, to turn the radio "off", by merely changing the position of the housing on the supporting surface. Most preferably the radio includes extension arms, or knobs, connected to the circuitry, and extending through a front wall of the housing to provide for the usual tuning and audio control. These extension arms can also be employed to facilitate different positioning of the radio as may suit the mood of the user, or as is dictated by the surrounding environment.

7 Claims, 5 Drawing Figures 4,158,173

MERCURY SWITCH ACTIVATED RADIO

BACKGROUND OF THE INVENTION

This invention relates to transistor radios, and more specifically, to a transistor radio employing a mercury switch for activating and deactivating the radio circuitry.

Radios commonly include separate arms or knobs connected to the radio circuitry, and extending through the radio housing to permit the usual tuning and audio control. In many of these radios the on-off switch is retained within the housing and is opened and closed by the same knob that is used to control the volume. It is not uncommon for a person intending to turn the radio off to inadvertently only turn the volume control knob to its lowest level, at which the sound is not heard without actually turning the radio "off" to deactivate the power circuitry. In battery-operated radios this will cause undesirable battery drainage, and if the radio is left in this condition for an excessively long period of time, the battery's charge will actually be completely dissipated. This same problem can occur when the volume control knob is inadvertently hit to turn the radio "on", but without the volume at an audible level. In both of the above situations the radio cannnot be heard to provide an audible indication that it was inadvertently left, or turned on. The present invention overcomes this problem in a unique and highly desirable manner.

SUMMARY OF THE INVENTION

A transistor radio includes a mercury switch that is mounted in a fixed position within an outer housing and that is connected to the radio circuitry within said housing. The housing is provided with a plurality of surfaces to permit it to be maintained in different stable positions on a supporting surface to either activate the mercury switch (turn the radio on) or deactivate the mercury switch (turn the radio off). The radio includes extension arms, or knobs, connected to the circuitry, and extending through a front wall of the housing to provide for the usual tuning and audio control. However, contrary to many prior art designs, the audio control knob does not control the on-off condition of the radio. Instead, the radio must be physically repositioned to cause the mercury switch to move from its deactivated condition, in which the radio is off, to its activated condition, in which the radio is on. Accordingly, the audio control knob can be left in a position to permit the radio, when activated, to emit a sound at a high enough volume so that it can be clearly heard. This position of the audio control knob can be maintained when the radio is turned off because the switch for the radio circuitry is not in any way associated with the audio control knob.

Most preferably the tuning and audio control knobs are in the form of cylindrical extensions that can also be used to help support the housing in different positions, as may suit the mood of the user, or as may be dictated by the nature of the surrounding environment.

Most preferably the housing is in the form of a clear plastic cube, and the radio can be turned on by positioning it in several different stationary positions on a supporting surface. Most preferably the loudspeaker within the housing is positioned to direct the sound through one wall of the cube, and the radio will be in its off mode when that wall is placed in engagement with the supporting surface. This prevents muffling of the sounds emitted by the speaker.

Other objects and advantages of this invention will become apparent by referring to the detailed description which follows, taken in conjunction with the drawings.

DESCRIPTION OF THE PREFERRED EMBODIMENT OF THE INVENTION

Figure 1:
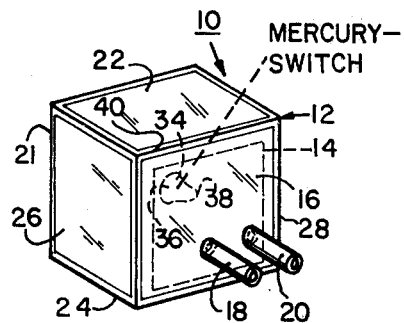
FIG. 1 is an isometric view of the radio, showing it resting upon its nominal base in an "off" mode.

Referring to FIG. 1, the radio 10 in accordance with this invention includes an outer, multi-sided housing 12; preferably in the form of a clear plastic cube. For example, the cube can be made from Plexiglas acrylic plastic.

Figure 3:
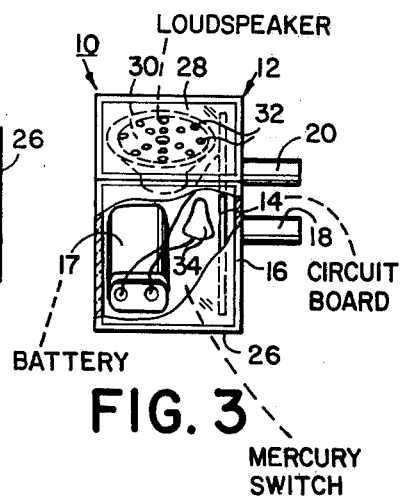
Figure 4:
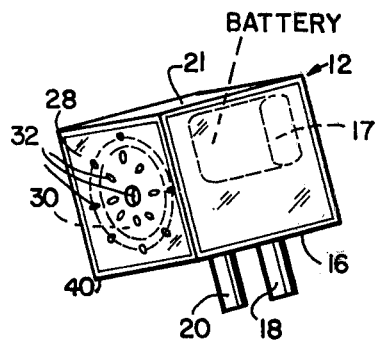
Figure 5:
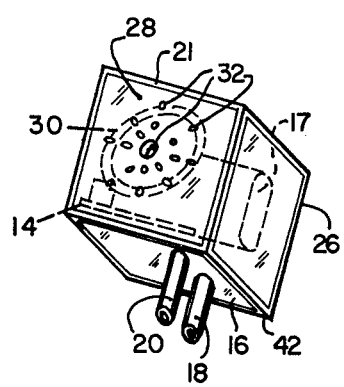

The radio circuitry is mounted on a circuit board 14 positioned adjacent front wall 16 of the housing (FIG. 3). This circuitry is powered in a conventional manner by battery 17, as is shown in FIGS. 3-5. Extension arms, or knobs 18 and 20 are connected to the power circuitry in a conventional manner, and extend through the front wall 16 of the housing to provide for the usual tuning and audio control, respectively. The tuning and audio control arms 18 and 20 are also used to help support the radio in different positions on a supporting surface, as will be explained in detail hereinafter.

In addition to front wall 16, the cubular housing 12 includes a back wall 21, a top wall 22, a bottom wall 24 and side walls 26 and 28, respectively. As can be seen most clearly in FIGS. 3-5, a loudspeaker 30 of the radio is positioned to emit audible sound waves through the side wall 28 of the housing. To permit clear emission of those sound waves the side wall 28 is provided with openings 32 through it. (FIGS. 3 and 5).

Referring to FIG. 3, a mercury switch 34 is positioned behind the circuit board 14, and is generally bell-shaped. The switch 34 is also shown in phantom representation in FIGS. 1 and 2. When the wide end 36 of the switch is higher than its opposed end 38, as shown in FIG. 1, the switch 34 is deactivated, and the power circuitry of the radio is de-energized to maintain the radio in its "off" mode. Accordingly, when the bottom wall 24 of the housing is supported on a flat surface, in the position shown in FIG. 1, the radio will be in an "off" mode.

Figure 2:
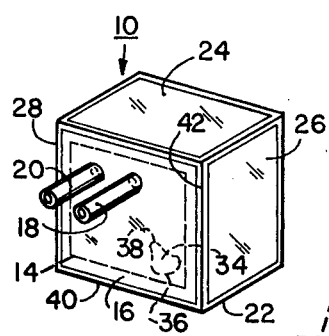
FIGS. 2-5 show the radio in various different "on" modes.

Referring to FIG. 2, the radio 10 is shown supported on its top wall 22. In this position the wide end 36 of the switch 34 is below its opposed end 38 to energize the radio circuitry and thereby turn the radio to its "on" mode.

Referring to FIG. 3, the radio 10 is shown in another "on" position with the housing 12 being supported on the side wall 26 opposed to the side wall 28 through which audible sound waves of the loudspeaker are emitted. However, when the radio is supported on the side wall 28, it will be in an "off" condition.

As can be seen in FIGS. 4 and 5, the radio of this invention can also be positioned in unique angular orientations relative to a supporting surface to activate the mercury switch, and thereby turn the radio on. The angular orientation of the radio 10 shown in FIG. 4 is maintained by contacting the supporting surface with the top front edge 40 (the edge formed at the junction of top wall 22 and front wall 16) of the housing 12 and the tuning and audio extension arms 18 and 20. In FIG. 5 the angular orientation of the radio 10 with respect to a supporting surface is maintained by contacting the supporting surface with extension arm 18 and the side front edge 42 formed at the junction of the front wall 16 and the side wall 26 (i.e. the side wall opposed to the apertured side wall through which the loudspeaker emits audible sound waves). Due to the location of the extension arms 18 and 20, they cannot be employed in conjunction with the other front edges of the housing 12 to support the radio in other angular orientations on a flat surface. In the preferred embodiment, the location of the arms 18 and 20 is chosen so that the only angular positions that can be maintained are "on" positions.

The unique construction of this invention permits energizing and de-energizing the radio circuitry by changing the orientation of the radio 10, as may suit the mood of the user, or, as may be required by the surrounding environment. As a result of this invention the radio circuitry can be activated by resting the cubular housing 12 on a support surface in any one of a number of different stable positions. It is contemplated that the various surfaces of the cube could be employed for carrying designs or photographs, as desired, and such designs or photographs could be then utilized to orient the cube in a preferred position in either the "on" or "off" mode in accordance with the desires and feelings of the user.

In accordance with this invention the extension arm 20 employed to control the audio level of the radio can be maintained and in a position to cause the radio to emit sounds that can be heard clearly when the radio is in an "on" mode. This can be accomplished because the on-off switch is not associated with the audio control arm 20, and therefor, the audio control arm 20 is not used to turn the radio on and off.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention is not limited by the foregoing specification, but only by the claims annexed hereto.

What is claimed is:

1. A transistor radio suitable for resting upon a supporting surface comprising circuitry and a mercury switch, each positioned within an outer housing, said housing having a generally cubical shape, said mercury switch being connected in a fixed position relative to said housing so as to be movable between circuit activating and circuit deactivating conditions by the movement of said housing among different stable positions corresponding to said conditions, said mercury switch being positioned within the housing so that it will be in a circuit-activating condition when any one of several different surfaces of the housing is maintained in at least one of said stable positions corresponding to said circuit-activating condition and in engagement with the supporting surface, and in a circuit deactivating condition when the housing is maintained in any one of other stable positions corresponding to said circuit-deactivating condition said radio being in an "on" mode when the circuitry is activated and in an "off" mode when the circuitry is deactivated.

2. The transistor radio according to claim 1 wherein at least some of the surfaces form angular junctions therebetween, the switches being in a circuit-activating condition when at least one of said junctions contacts the supporting surface.

3. The transistor radio according to claim 1 including tuning and audio control members connected to the circuitry and extending through a front wall of the housing, said housing including a plurality of front edges formed at the junction of the front wall and its adjacent walls, said mercury switch being positioned within said housing so that it will be activated by orienting the housing in a respective stable position with one of its front edges engaging the supporting surface.

4. The transistor radio according to claim 3, wherein at least one of the tuning and audio control members also engages the supporting surface.

5. The transistor radio according to claim 3 wherein both of the tuning and audio control members also engage the supporting surface.

6. The transistor radio according to claim 1 including a loudspeaker positioned within the housing for directing audible sound through one flat housing wall, said mercury switch being retained in a position within the housing to deactivate the circuitry when the wall through which the audible sound is directed is positioned in engagement with the supporting surface.

7. The transistor radio according to claim 6 wherein the mercury switch is positioned to activate the circuitry when other flat surfaces of the housing are in engagement with the supporting surface.

* * * * *